United States Patent
Feng et al.

(10) Patent No.: US 11,443,119 B2
(45) Date of Patent: Sep. 13, 2022

(54) ADAPTING DIALOG MODELS BY RELEVANCE VALUE FOR CONCEPTS TO COMPLETE A TASK

(71) Applicant: International Business Machines Corporation, Armonk, NY (US)

(72) Inventors: Song Feng, New York, NY (US); Qingzi Liao, White Plains, NY (US); Luis A. Lastras-Montano, Cortlandt Manor, NY (US); Robert G. Farrell, Cornwall, NY (US); Ana Smith, Ithaca, NY (US)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 16/860,819

(22) Filed: Apr. 28, 2020

(65) Prior Publication Data

US 2021/0334469 A1    Oct. 28, 2021

(51) Int. Cl.

| G06F 40/279 | (2020.01) |
| G06F 40/30 | (2020.01) |
| G06F 40/35 | (2020.01) |
| G06F 40/284 | (2020.01) |
| G06N 5/04 | (2006.01) |
| G06N 20/00 | (2019.01) |

(52) U.S. Cl.
CPC ............ *G06F 40/30* (2020.01); *G06F 40/284* (2020.01); *G06N 5/04* (2013.01); *G06N 20/00* (2019.01)

(58) Field of Classification Search
CPC .... G06F 40/279; G06F 40/284; G06F 40/289; G06F 40/30; G06F 40/35; G06N 20/00; G06N 20/10; G10L 15/06; G10L 15/22

USPC ............ 704/1, 9, 232; 706/12, 16; 707/728, 707/730, 749, 750

See application file for complete search history.

(56) References Cited

U.S. PATENT DOCUMENTS

| 9,672,827 | B1* | 6/2017 | Jheeta | G06F 40/35 |
| 10,679,150 | B1* | 6/2020 | Larson | G06F 40/279 |
| 10,867,245 | B1* | 12/2020 | Farhady Ghalaty | G06N 3/084 |
| 10,929,611 | B2* | 2/2021 | Eisenzopf | G06F 40/30 |
| 2004/0148154 | A1* | 7/2004 | Acero | G06F 40/216 |
| | | | | 704/1 |
| 2008/0021701 | A1* | 1/2008 | Bobick | G06F 40/284 |
| | | | | 704/9 |

(Continued)

FOREIGN PATENT DOCUMENTS

WO    WO 2020/0118422    *    6/2020

OTHER PUBLICATIONS

Harissh et al., "Unsupervised Domain Ontology Learning from Text," Lecture Notes in Computer Science, Apr. 2017, 16 pages.

(Continued)

*Primary Examiner* — Martin Lerner
(74) *Attorney, Agent, or Firm* — Stosch Sabo; Ryan, Mason & Lewis, LLP

(57) ABSTRACT

A computer-implemented method identifies one or more concepts from a document, wherein the document comprises information on completing a task. The method computes a relevance value of an utterance with respect to completing the task using the one or more identified concepts. The method removes the utterance from a dialog model to be used for completing the task when the relevance value of the utterance is below a given threshold value.

20 Claims, 6 Drawing Sheets

(56) References Cited

U.S. PATENT DOCUMENTS

| | | | | |
|---|---|---|---|---|
| 2011/0270604 | A1* | 11/2011 | Qi | G06F 40/30 704/9 |
| 2015/0179168 | A1 | 6/2015 | Hakkani-Tur et al. | |
| 2015/0269139 | A1* | 9/2015 | McAteer | G06F 40/30 704/9 |
| 2016/0232160 | A1 | 8/2016 | Buhrmann et al. | |
| 2018/0060287 | A1* | 3/2018 | Srinivasan | G06F 40/284 |
| 2018/0226068 | A1* | 8/2018 | Hall | G10L 15/22 |
| 2018/0307674 | A1* | 10/2018 | Akkiraju | G10L 15/22 |
| 2019/0237068 | A1 | 8/2019 | Canim et al. | |
| 2019/0311301 | A1* | 10/2019 | Pyati | G06N 20/00 |
| 2019/0340243 | A1* | 11/2019 | Beaver | G06F 40/30 |
| 2021/0209072 | A1* | 7/2021 | Trim | G06F 40/30 |
| 2021/0248323 | A1* | 8/2021 | Maheshwari | G06F 40/284 |
| 2021/0254994 | A1* | 8/2021 | Aït-Mokhtar | G06F 40/30 |

OTHER PUBLICATIONS

G.S. Kumar et al., "Concept Relation Extraction Using Naive Bayes Classifier for Ontology-Based Question Answering Systems," Journal of King Saud University—Computer and Information Sciences, Jan. 2015, pp. 13-24, vol. 27, No. 1.

R. Jia et al., "Learning Concepts Through Conversations in Spoken Dialogue Systems," IEEE International Conference on Acoustics, Speech and Signal Processing (ICASSP), Mar. 5-9, 2017, pp. 5725-5729.

J. Ohmura et al., "Context-Aware Dialog Re-Ranking for Task-Oriented Dialog Systems," IEEE Spoken Language Technology Workshop (SLT), Dec. 18-21, 2018, 8 pages.

M. Noseworthy et al., "Predicting Success in Goal-Driven Human-Human Dialogues," Proceedings of the 18th Annual SIGdial Meeting on Discourse and Dialogue, Aug. 2017, pp. 253-262.

T. Oya et al., "Extractive Summarization and Dialogue Act Modeling on Email Threads: An Integrated Probabilistic Approach," Proceedings of the 15th Annual Meeting of the Special Interest Group on Discourse and Dialogue (SIGDIAL), Jun. 2014, pp. 133-140.

A. Barrera et al., "Combining Syntax and Semantics for Automatic Extractive Single-Document Summarization," Proceedings of the 13th International Conference on Computational Linguistics and Intelligent Text Processing—vol. Part II, Mar. 2012, pp. 366-377.

F. Barrios et al., "Variations of the Similarity Function of TextRank for Automated Summarization," Argentine Symposium on Artificial Intelligence (ASAI), Sep. 2015, pp. 65-72.

H. He et al., "Learning Symmetric Collaborative Dialogue Agents with Dynamic Knowledge Graph Embeddings," Proceedings of the 55th Annual Meeting of the Association for Computational Linguistics, Jul. 2017, pp. 1766-1776.

P. Ammanabrolu et al., "Playing Text-Adventure Games with Graph-Based Deep Reinforcement Learning," Proceedings of Conference of the North American Chapter of the Association for Computational Linguistics: Human Language Technologies (NAACL-HLT), Jun. 2019, pp. 3557-3565.

R.C. Gunasekara et al., "Quantized-Dialog Language Model for Goal-Oriented Conversational Systems," arXiv: 1812.10356v1, Dec. 26, 2018, 6 pages.

N.I. Nikolov et al., "Data-Driven Summarization of Scientific Articles," arXiv:1804.08875v1 [cs.CL], Apr. 24, 2018, 6 pages.

C.W. Goo et al., "Abstractive Dialogue Summarization with Sentence-Gated Modeling Optimized by Dialogue Acts," 2018 IEEE Spoken Language Technology Workshop (SLT), 735-742.

A.J.P. Tixier et al. "Perturb and Combine to Identify Influential Spreaders in Real-World Networks," arXiv:1807.09586v2 [cs.SI], Sep. 4, 2018, 8 pages.

R. Higashinaka et al., "Syntactic Filtering and Content-Based Retrieval of Twitter Sentences for the Generation of System Utterances in Dialogue Systems," Signals and Communication Technology, Apr. 21, 2016, pp. 15-26.

A. Otsuka et al., "Utterance Selection Using Discourse Relation Filter for Chat-Oriented Dialogue Systems," Lecture Notes in Electrical Engineering (LNEE), vol. 427, Dec. 25, 2016, pp. 355-365.

* cited by examiner

U1: MY COMPANY OWNED iPHONE HAS A CRACKED SCREEN.

U2: HOW CAN I GET A REPAIR?

A1: LET ME LOGIN TO THE SYSTEM TO ASSIST YOU.

U3: OK THX FOR LOOKING INTO IT OUT FOR ME!

A2: STILL TRYING TO LOGIN. THANK YOU FOR YOUR PATIENCE.

A3: LET ME VERIFY YOUR WARRANTY OF THIS DEVICE.

U4: YEAH, OF COURSE.

A4: COULD YOU VERIFY YOUR SERIAL NUMBER?

ADAPTING DIALOG MODELS BY RELEVANCE VALUE FOR CONCEPTS TO COMPLETE A TASK

BACKGROUND

The present application relates to computing systems that are configured to serve as spoken dialog systems. A spoken dialog system (or simply, dialog system) is a computing system configured to converse with a human voice in order to have a human-to-human (human-human) conversation with a user. Two main components of a dialog system include a speech recognition module used to convert input speech to text and a text-to-speech module used to convert text to output speech. Dialog systems typically use dialog models that have to be trained using dialog data, i.e., input speech provided during a training stage. However, depending on the dialog data used to train a dialog system, efficient task completion by the dialog system can be challenging.

SUMMARY

Embodiments of the invention provide techniques for adapting a dialog model to improve task completion efficiency in a dialog system.

In one illustrative embodiment, a computer-implemented method comprises the following steps. The method identifies one or more concepts from a document, wherein the document comprises information on completing a task. The method computes a relevance value of an utterance with respect to completing the task using the one or more identified concepts. The method removes the utterance from a dialog model to be used for completing the task when the relevance value of the utterance is below a given threshold value.

For example, an utterance that falls below such a given threshold value is considered a non-essential utterance with respect to completing the task. By removing such an utterance from training data associated with the dialog model in order to generate an adapted model, task completion efficiency using the adapted model is improved in comparison to using the original, un-adapted model (i.e., the model with training data that includes the non-essential utterance).

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 1 depicts an example of a dialog system-based conversation with which one or more illustrative embodiments can be implemented.

DETAILED DESCRIPTION

Figure 2A:
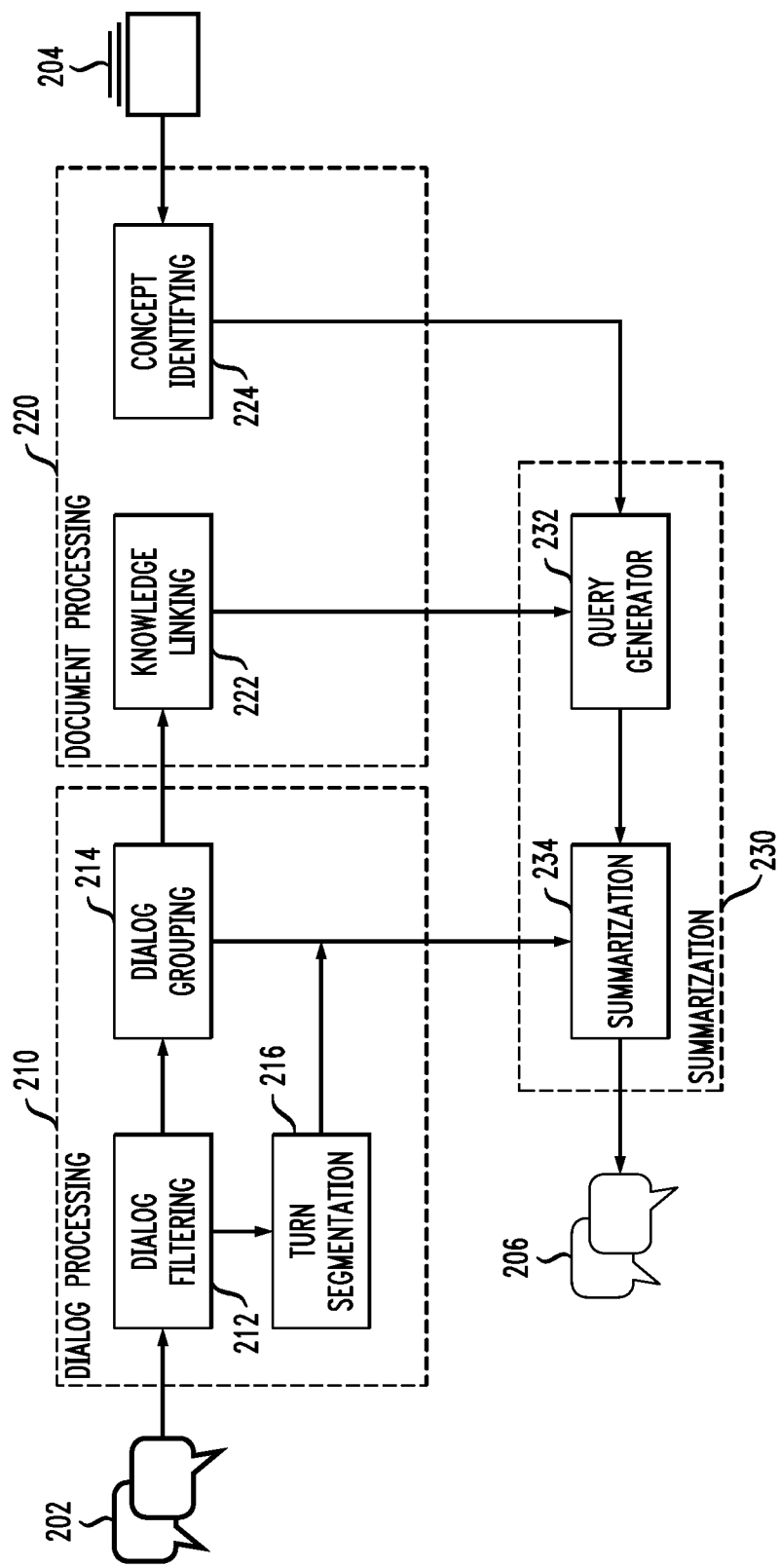
FIG. 2A depicts a dialog system according to an illustrative embodiment.

Illustrative embodiments may be described herein with reference to exemplary computing environments, cloud infrastructure, data repositories, data centers, data processing systems, information processing systems, computer systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud platform," "cloud computing environment," "cloud infrastructure," "data repository," "data center," "data processing system," "information processing system," "computer system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above in the background section, task completion by a dialog system can be challenging depending on the dialog data used to train the dialog system. For example, as realized herein, a dialog system trained on transcripts of human-human conversations can do a poor job of completing tasks because it is trained on dialog data with non-essential utterances. A "non-essential utterance" as illustratively used herein is input speech during a conversation with a dialog system that is not necessarily needed by the dialog system to complete a given task. Thus, for example, what is essential and non-essential is considered from the perspective of the dialog system. Recall that "human-human" conversations in the context of a dialog system refers to the conversation between the dialog system using a human voice and a human user.

Illustrative embodiments overcome challenges with existing dialog systems by providing a method for processing human-human dialog to enable a more efficient and effective training procedure for dialog subtasks on task completion by determining which dialog turns are essential to the task and reduce the influence of any non-essential utterances. The method generates a more compact style of interactions while retaining the completeness of the task completion for model training.

FIG. 1 illustrates an example of a human-human conversation 100 that includes non-essential utterances according to an illustrative embodiment. Assume in conversation 100 that the letter "U" represents a human user and the letter "A" represents a dialog system using a human voice generated by a text-to-speech module. Thus, each conversation or dialog turn taken by each participant (i.e., user and dialog system) is represented by incrementing a number after the letter representing the participant, i.e., the sequential human user turns are U1, U2, U3 and U4, while the sequential dialog system turns are A1, A2, A3 and A4.

The conversation 100 in this non-limiting example relates to the user interacting with the dialog system to initiate a repair of a company-owned cellular (cell) phone, and the dialog system seeking to obtain needed information from the user to complete the repair initiation task. Note that while the dialog system can be part of the system that actually manages the repair, more typically the dialog system is a separate system that functionally resides between the user and the repair system and serves as an interface to get the repair task started.

Accordingly, with regard to the utterances in the user turns in conversation 100, U1 and U2 are considered essential utterances since these utterances are informing the dialog system about the nature of the repair (cracked screen on user's cell phone). However, U3 and U4 are non-essential because they are just the user expressing appreciation for the assistance (U3) and the user confirming he understood what the dialog system said (U4). Thus, as example conversation 100 illustrates, utterances that provide relevant information needed to perform a task are considered essential, while utterances that do not provide relevant information needed to perform the task are considered non-essential.

It is to be appreciated, however, that the examples of non-essential utterances in conversation 100 could be considered essential in another context depending on the nature of the task being performed by the dialog system. For example, if the task is to determine user satisfaction and/or user understanding, then U3 and/or U4 could be considered essential, while U1 and U2 could be considered non-essential. Illustrative embodiments are not intended to be limited to what a particular dialog situation specifically defines, ahead of time, as an essential utterance versus a non-essential utterance. Rather, given the definitions predetermined for the given context, illustrative embodiments apply those definitions.

As will be further explained herein, illustrative embodiments model human-human conversation turns with "summary labels" for representing the relatedness (i.e., relevance or importance) to task completion. The summary labels differentiate "information management turns" and "conversation management turns" in the dialog. Thus, as illustratively used herein, an information management turn contains utterances that are considered essential to task completion because they include task completion-relevant information (e.g., U1 and U2), while conversation management turns contain utterances that are considered non-essential to task completion because they do not include task completion-relevant information (e.g., U3 and U4).

In some embodiments, an unsupervised, query-based extractive summarization approach is used to predict the summary labels using both document (e.g., the text side of the user/dialog system interaction) and conversation (e.g., the spoken side of the user/dialog system interaction). The queries are domain-focused via documents, as well as conversation-focused via the sampled conversations. Conversation-based queries are effective in identifying conversation management turns, while document-based queries are effective in identifying information management turns for the summarization.

In further embodiments, the method uses summary labels as auxiliary information for training a neural conversation model (i.e., a dialog model). While in other embodiments, the method adapts (e.g. reshapes, re-styles) a dialog model to serve a different purpose for either conversation management or information management, in an unsupervised manner.

FIG. 2A depicts a dialog system 200 according to an illustrative embodiment. As shown, dialog system 200 comprises a dialog processing module 210 operatively coupled to a document processing module 220, which are both operatively coupled to a summarization module 230. Dialog processing module 210 comprises a dialog filtering sub-module 212 operatively coupled to a dialog grouping sub-module 214 and a turn segmentation sub-module 216. Document processing module 220 comprises a knowledge linking sub-module 222 and a concept identifying sub-module 224. Summarization module 230 comprises a query generator sub-module 232 operatively coupled to a summarization sub-module 234.

Dialog processing module 210 performs dialog log (also referred to as "chat log") data pre-processing based on input speech 202 including, as will be further explained, selecting the chat logs with document reference, and clustering the dialog based on topics while segmenting long dialog turns. More particularly, dialog filtering sub-module 212 selects the chat logs with reference to document corpus 204. Dialog grouping sub-module 214 clusters the dialog based on topics. Turn segmentation sub-module 216 segments the long dialog into several sub-dialogs.

Document processing module 220 performs knowledge linking and concept identifying, as further explained below. More particularly, knowledge linking sub-module 222 links dialog to domain knowledge by scoring the utterance based on the one or more concepts extracted from the training (e.g., grounding) conversations and one or more documents in the corpus 204 that describe the task sought to be completed. In illustrative embodiments, extraction of concepts from a document in a corpus uses a graph. Concept identifying sub-module 224, in illustrative embodiments, employs k-core decomposition for weighting words according to a centrality measure within a document graph. For example, a measure of centrality comprises one or more of degree centrality, Katz centrality, and between-ness centrality. Sub-module 224 then identifies a text node from the graph with a higher weight as an import concept. More particularly, in a text graph, as will be further explained below in an illustrative embodiment in the context of FIG. 2B, nodes are domain entity names that are extracted from a domain taxonomy as well as the entity extraction (e.g., using natural language processing (NLP) software) using the documents, while edges are based on the text proximity that is estimated based on the distance between the entities in the document, such as if they appear in the same sentence or same list, etc. Once the text graph is constructed, k-core decomposition is applied to obtain a score for each node for ranking their importance based on the score.

Query generator sub-module 232 of summarization module 230 generates queries including conversation-based queries and document-based queries, as will be further explained below. More particularly, query generator sub-module 232 samples dialog turns as queries which are then classified as conversation-based or document-based based on the overlap with the one or more identified concepts from concept identifying sub-module 224. Qualitatively, in accordance with illustrative embodiments, conversation-based queries result in summaries that resemble qualities of conversations and agent behavior (e.g., "hi. how may I help you today?"), while document-based queries result in dialog summaries that more resemble the procedural and informative qualities of trouble-shooting documents (e.g., "my email client keeps crashing after an OS update").

Summarization sub-module 234 of summarization module 230 predicts summary labels by determining a budget, computing the similarity between an i-th turn and the query, and optimizing a result with maximum marginal relevance (MMR), integer linear programming (ILP) and/or sequential minimal optimization (SMO), as will be further explained below. More particularly, summarization sub-module 234 determines a budget (e.g., a number of dialog turns to be included in the output summarization or dialog summary 206 in FIG. 2A), then computes the similarity between an i-th turn and the query that is optimized with MMR/ILP/SMO for determining the inclusion or exclusion of a turn.

In illustrative embodiments, the dialog summary (output 206) is a sequence of labels. Each label corresponds to one dialog turn. In one illustrative embodiment, the type of label may be Boolean (0 or 1) wherein a label of 1 indicates that the turn is included in the summary, while a label of 0 indicates that turn is excluded in the dialog summary. Determination as to which turn is labeled as a 1 or 0 can be made using a threshold information value. For example, if a score generated via the knowledge linking (222) and concept identifying (224) operations is above the threshold value then the label of the given turn is set at 1 (information-management turn), otherwise the label for the given turn is set at 0 (conversation-management turn).

Figure 2B:
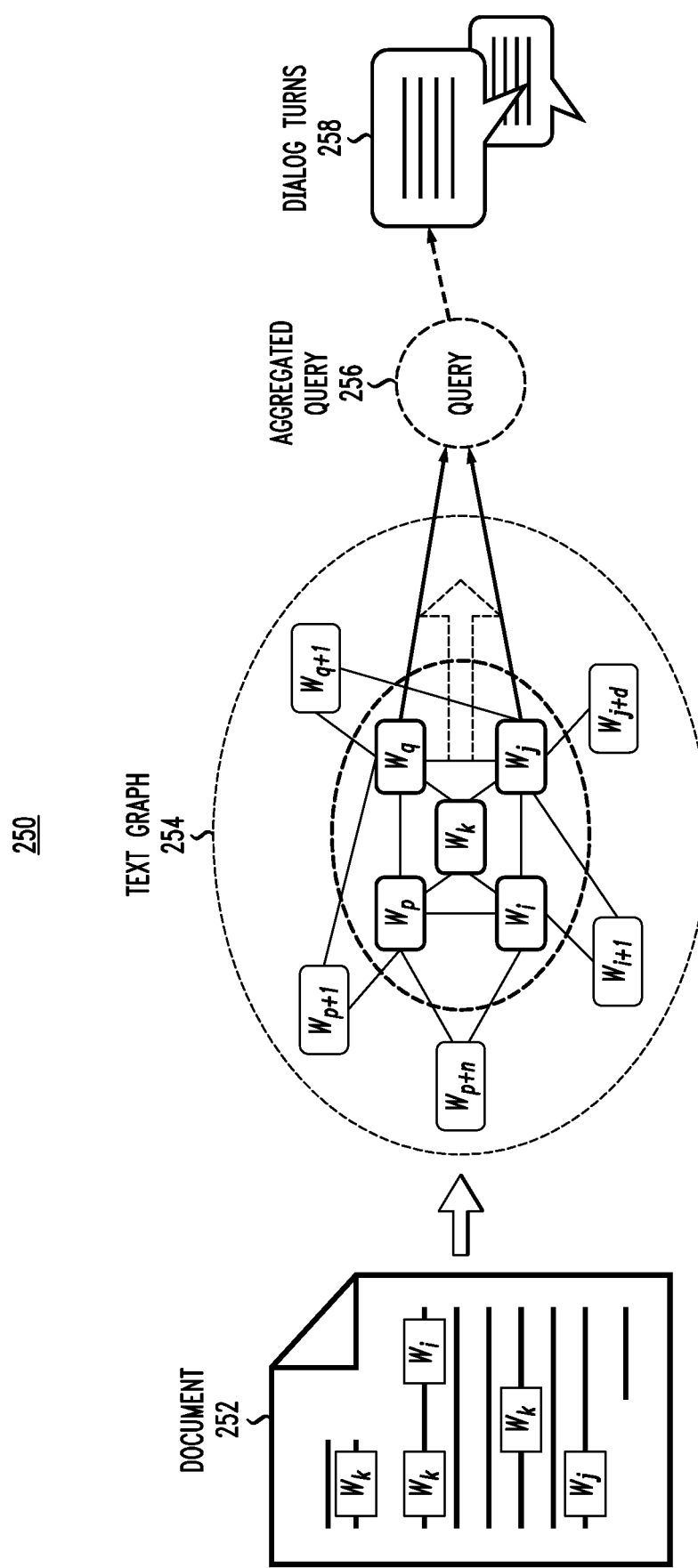
FIG. 2B depicts further details of a dialog system according to an illustrative embodiment.

FIG. 2B provides further illustration 250 of the dialog modeling operations of knowledge linking sub-module 222, concept identifying sub-module 224 and query generator sub-module 232 in FIG. 2A. By dialog modeling, it is meant that dialog turns of a given dialog are labeled as an information-management turn or a conversation-management turn wherein information-management turns are given priority and included in the dialog summary while conversation-management turns are removed. The dialog summary with one or more removed dialog turns is considered an adapted dialog model.

In FIG. 2B, document 252 is an example of a document from corpus 204 (FIG. 2A), while text graph 254 is generated from document 252 using k-core decomposition, as mentioned above, and used to compose an aggregated query 256. Document-based queries are used for searching dialog turns with high semantic similarity to a given query. Those turns are labeled as information-management turns, i.e., they are identified as to be included in dialog summary 258.

Figure 3:
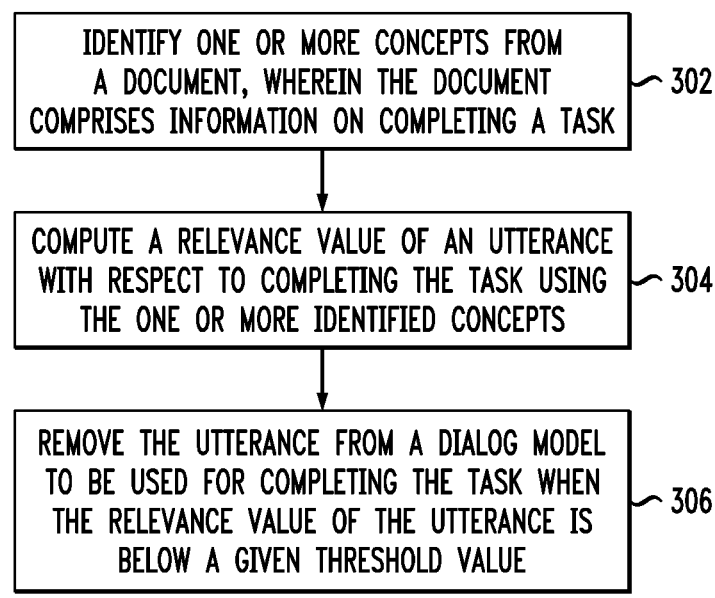
FIG. 3 depicts a dialog system methodology according to an illustrative embodiment.

FIG. 3 depicts a dialog system methodology 300 according to an illustrative embodiment. It is to be appreciated that methodology 300 can be performed by dialog system 200 of FIG. 2A. For example, as will be further explained below, steps 302, 304 and 306 are performed in accordance with modules/sub-modules in FIG. 2A. The output of the labeled dialog (206 in FIG. 2A) can be used downstream for further dialog tasks. However, in alternative embodiments, methodology 300 can be performed by other dialog systems configured to perform the steps of the methodology.

Methodology 300 generates an automated conversational system to assist a user in completing a task. As shown, step 302 identifies one or more concepts from a document, wherein the document comprises information on completing a task. Step 304 computes a relevance value of an utterance with respect to completing the task using the one or more identified concepts. Step 306 removes the utterance from a dialog model to be used for completing the task when the relevance value of the utterance is below a given threshold value.

In some embodiments, selecting concepts from a text graph extracted from documents uses centrality including one or more of degree centrality, Katz centrality, and between-ness centrality of the graph. In some embodiments, concepts include one or more of non-stop word unigrams, nouns, noun phrases, other linguistic constituents, and/or tokens. In some embodiments, determining relevance or salience includes determining one or more of term frequency, inverse document frequency, and term frequency-inverse document frequency (tf-idf). Further, in some embodiments, an incremental relevance value is determined using MMR, ILP and/or SMO.

The techniques depicted in FIGS. 1-3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 1-3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
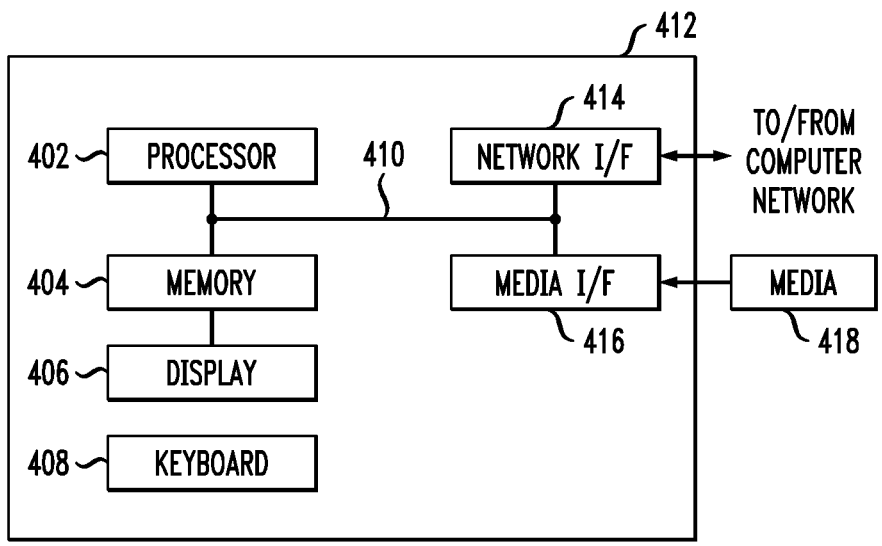
FIG. 4 depicts an exemplary computer system according to an illustrative embodiment.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
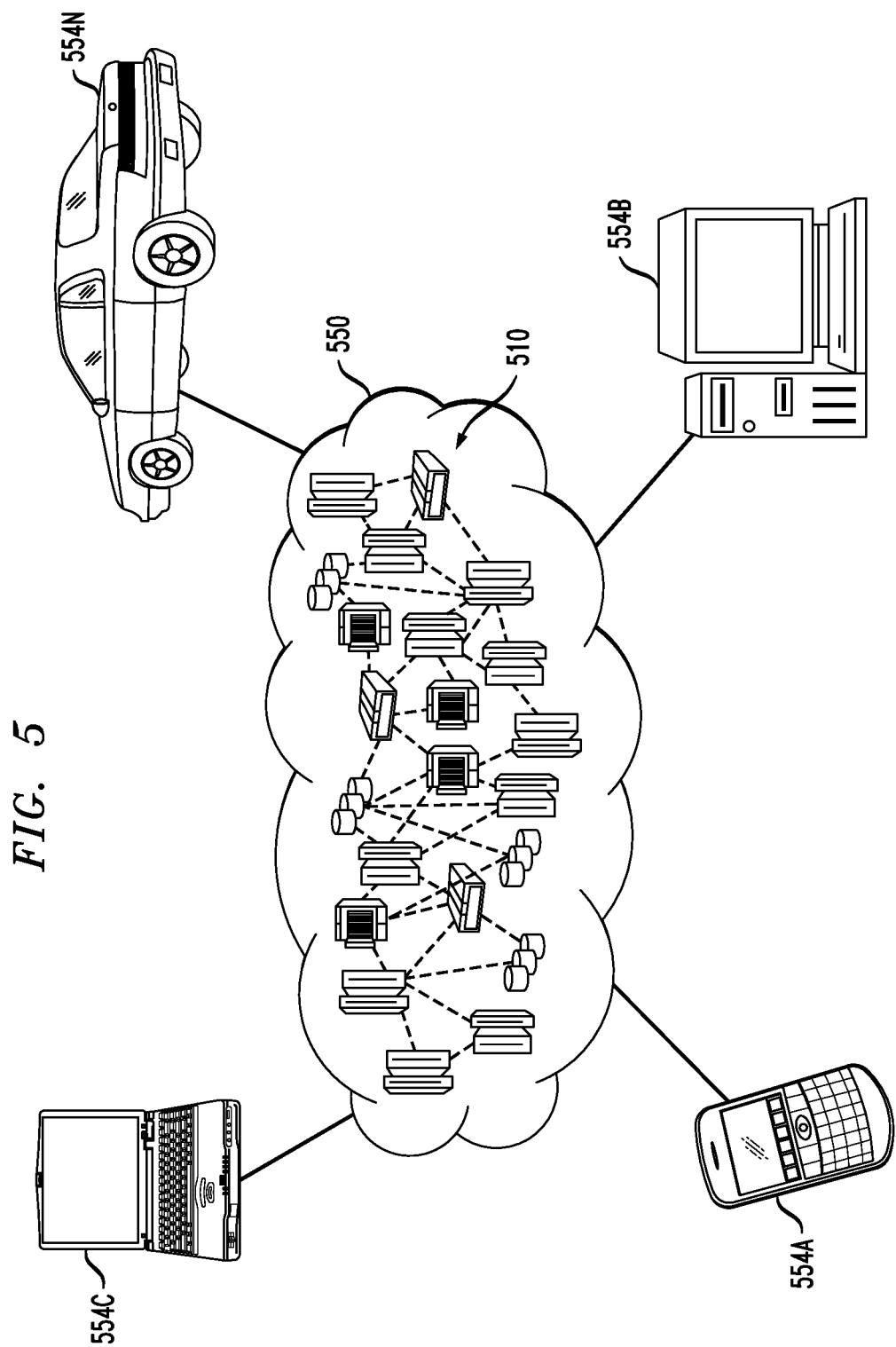
FIG. 5 depicts a cloud computing environment according to an illustrative embodiment.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
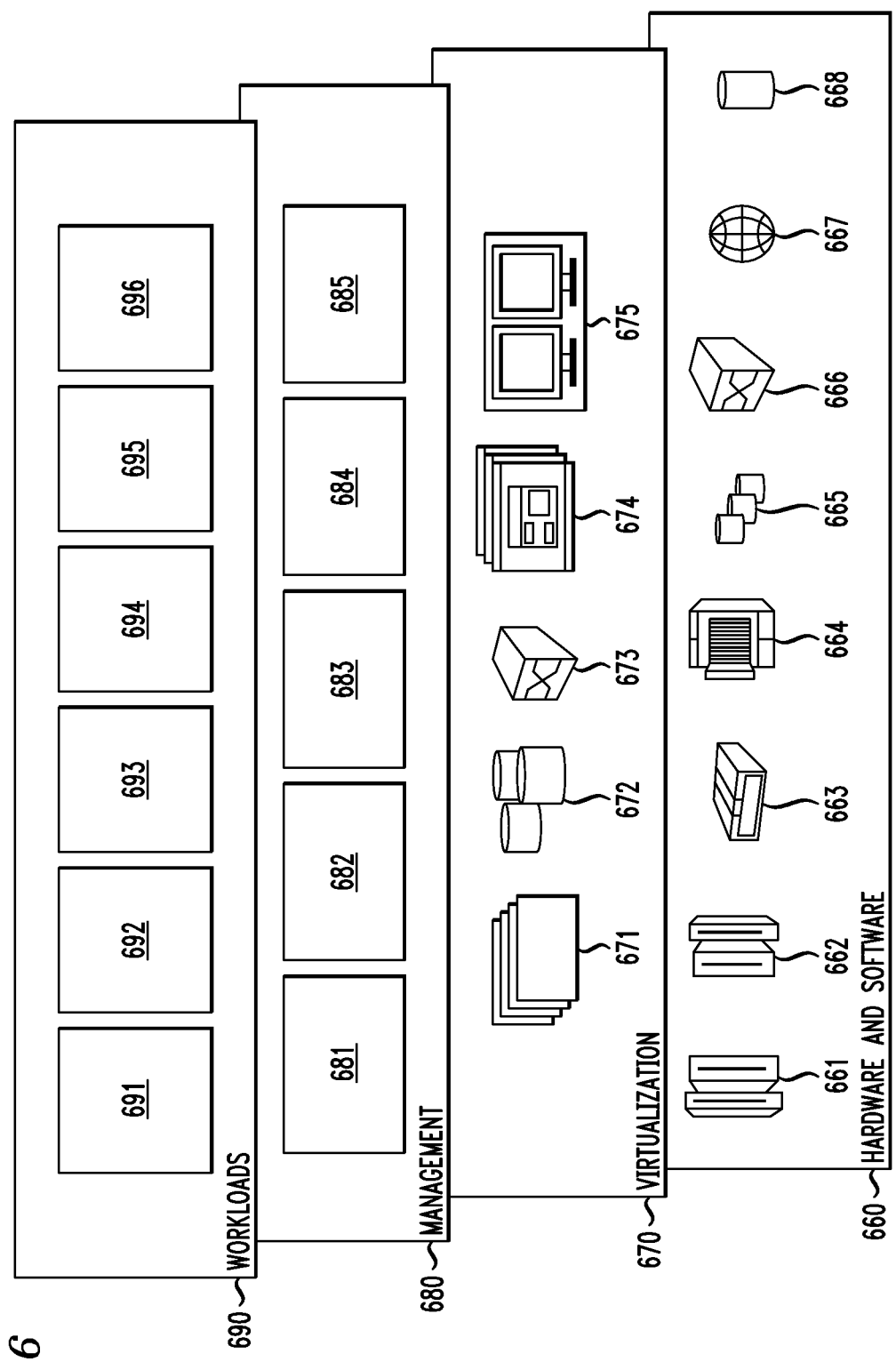
FIG. 6 depicts abstraction model layers according to an illustrative embodiment.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture-based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675. In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and dialog system task completion framework 696, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) that replaces the complex manual (e.g., custom-built) development of model restoration logic. As illustratively described herein, the framework is configured and instantiated with a set of failure detection components and associated model restoration pipelines. Once instantiated, the framework plugs into a given lifecycle using logs as inputs and delivers new model artifacts for a new model version into the existing lifecycle pipelines. In one or more illustrative embodiments, the framework is a cloud-based framework and platform for end-to-end development and lifecycle management of AI applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   at least one processor;
   at least one memory including computer program code;
   the at least one memory and the computer program code being configured to, with the at least one processor, cause the apparatus at least to:

identify one or more relevant concepts from a document, the one or more relevant concepts comprising information relevant to completing a task;

obtain conversation turns in association with a dialog to be included in a dialog model to be used for completing the task;

compute a relevance value of one or more utterances of the conversation turns with respect to completing the task using the one or more relevant concepts;

assign summary labels to the conversation turns in the dialog based on the relevance values computed for the one or more utterances of the conversation turns, the summary labels identifying conversation management turns and information management turns, the conversation management turns comprising one or more utterances that are considered non-essential with respect to completing the task, the information management turns comprising one or more utterances that are considered essential with respect to completing the task; and remove one or more utterances associated with a given conversation management turn from the dialog model when the relevance value of the one or more utterances is determined to be below a given threshold value.

2. The apparatus of claim 1, wherein identifying the one or more relevant concepts from the document comprises a graph-based decomposition process.

3. The apparatus of claim 2, wherein computing the relevance value comprises determining a measure of centrality associated with a text graph.

4. The apparatus of claim 1, wherein identifying the one or more relevant concepts from the document further comprises computation of one or more of a term frequency, an inverse document frequency, and a term frequency-inverse document frequency.

5. The apparatus of claim 1, wherein the one or more relevant concepts comprise one or more of linguistic constituents and tokens.

6. The apparatus of claim 1, wherein computing the relevance value further comprises computing one or more of a maximum marginal relevance value, an integer linear programming value, and a sequential minimal optimization value.

7. The apparatus of claim 1 wherein assigning summary labels to the conversation turns includes utilizing Boolean type labels to identify the conversation management turns and the information management turns.

8. A computer-implemented method comprising:
identifying one or more relevant concepts from a document, the one or more relevant concepts comprising information relevant to completing a task;

obtaining conversation turns in association with a dialog to be included in a dialog model to be used for completing the task;

computing a relevance value of one or more utterances of the conversation turns with respect to completing the task using the one or more relevant concepts;

assigning summary labels to the conversation turns in the dialog based on the relevance values computed for the one or more utterances of the conversation turns, the summary labels identifying conversation management turns and information management turns, the conversation management turns comprising one or more utterances that are considered non-essential with respect to completing the task, the information management turns comprising one or more utterances that are considered essential with respect to completing the task; and removing one or more utterances associated with a given conversation management turn from the dialog model when the relevance value of the one or more utterances is determined to be below a given threshold value.

9. The method of claim 8, wherein identifying the one or more relevant concepts from the document further comprises a graph-based decomposition process.

10. The method of claim 9, wherein computing the relevance value comprises determining a measure of centrality associated with a text graph.

11. The method of claim 8, wherein identifying the one or more relevant concepts from the document further comprises computation of one or more of a term frequency, an inverse document frequency, and a term frequency-inverse document frequency.

12. The method of claim 8, wherein the one or more relevant concepts comprise one or more of linguistic constituents and tokens.

13. The method of claim 8, wherein computing the relevance value further comprises computing one or more of a maximum marginal relevance value, an integer linear programming value, and a sequential minimal optimization value.

14. The method of claim 8, wherein assigning summary labels to the conversation turns includes utilizing Boolean type labels to identify the conversation management turns and the information management turns.

15. An article of manufacture comprising a non-transitory computer-readable storage medium having embodied therein executable program code that when executed by a processor causes the processor to perform steps of:
identifying one or more relevant concepts from a document, the one or more relevant concepts comprising information relevant to completing a task;

obtaining conversation turns in association with a dialog to be included in a dialog model to be used for completing the task;

computing a relevance value of one or more utterances of the conversation turns with respect to completing the task using the one or more relevant concepts;

assigning summary labels to the conversation turns in the dialog based on the relevance values computed for the one or more utterances of the conversation turns, the summary labels identifying conversation management turns and information management turns, the conversation management turns comprising one or more utterances that are considered non-essential with respect to completing the task, the information management turns comprising one or more utterances that are considered essential with respect to completing the task; and removing one or more utterances associated with a given conversation management turn from the dialog model when the relevance value of the one or more utterances is determined to be below a given threshold value.

16. The article of claim 15, wherein identifying the one or more relevant concepts from the document comprises a graph-based decomposition process.

17. The article of claim 16, wherein computing the relevance value comprises determining a measure of centrality associated with a text graph.

18. The article of claim 15, wherein identifying the one or more relevant concepts from the document further comprises computation of one or more of a term frequency, an inverse document frequency, and a term frequency-inverse document frequency.

19. The article of claim 15, wherein the one or more relevant concepts comprise one or more of linguistic constituents and tokens.

20. The article of claim 15, wherein computing the relevance value further comprises computing one or more of a maximum marginal relevance value, an integer linear programming value, and a sequential minimal optimization value.

* * * * *